(12) United States Patent
Margalit et al.

(10) Patent No.: US 6,504,971 B1
(45) Date of Patent: Jan. 7, 2003

(54) MULTILAYER INTEGRATED OPTICAL DEVICE AND A METHOD OF FABRICATION THEREOF

(75) Inventors: Moti Margalit, Zichron Yaaqov (IL); Meir Orenstein, Haifa (IL)

(73) Assignee: Lambda Crossing Ltd., Caesaria (IL)

( * ) Notice: Subject to any disclaimer, the term of this patent is extended or adjusted under 35 U.S.C. 154(b) by 0 days.

(21) Appl. No.: 09/840,445

(22) Filed: Apr. 24, 2001

Related U.S. Application Data
(60) Provisional application No. 60/232,061, filed on Sep. 12, 2000.

(30) Foreign Application Priority Data

Apr. 24, 2000 (IL) .................................................. 135806

(51) Int. Cl.$^7$ ................................................ G02B 6/28
(52) U.S. Cl. ...................................................... 385/24
(58) Field of Search ............................... 385/16, 10, 11, 385/24, 37, 130, 131, 40, 901, 17; 359/326, 573, 251, 283; 369/112.27, 112.29, 44.23, 44.28, 44.29; 372/102, 6

(56) References Cited

U.S. PATENT DOCUMENTS

| | | | |
|---|---|---|---|
| 4,720,160 A | | 1/1988 | Hicks, Jr. |
| 4,852,117 A | | 7/1989 | Po |
| 4,901,321 A | | 2/1990 | Blondeau et al. |
| 5,134,681 A | | 7/1992 | Ratovelomanana et al. |
| 5,544,268 A | * | 8/1996 | Bischel et al. ............... 385/16 |
| 5,581,642 A | * | 12/1996 | Deacon et al. ............ 359/573 |
| 5,586,206 A | * | 12/1996 | Brinkman et al. ........... 385/16 |
| 5,664,032 A | * | 9/1997 | Bischel et al. ............... 385/10 |
| 5,724,463 A | * | 3/1998 | Deacon et al. ............... 385/10 |
| 5,781,670 A | * | 7/1998 | Deacon et al. ............. 359/326 |
| 5,911,018 A | * | 6/1999 | Bischel et al. ............... 385/11 |
| 5,912,997 A | * | 6/1999 | Bischel et al. ............... 385/10 |
| 6,078,704 A | * | 6/2000 | Bischel et al. ............... 385/10 |

FOREIGN PATENT DOCUMENTS

| | | |
|---|---|---|
| EP | 0 240 400 | 7/1987 |
| EP | 0 819 956 | 1/1998 |
| GB | 2 306 694 | 5/1997 |

(List continued on next page.)

OTHER PUBLICATIONS

Little, B.E. et al., "Vertically Coupled Glass Microring Resonator Channel Dropping Filters", IEEE Photonics Technology Letters, vol. 11, No. 2, Feb. 1999.

K. Bloetekjaer, "Theoretical Concepts of a Novel Vernier–based Fringe–counting Fibre optic Sensor", IEEE Proceedings: Optoelectronics, Institution of Electrical Engineers, Stevenage, GB, vol. 144, No. 3, Jun. 1, 1997, pp. 126–129, XP000790964, ISSN: 1350–2433.

*Primary Examiner*—Akm E. Ullah
(74) *Attorney, Agent, or Firm*—Browdy and Neimark

(57) ABSTRACT

A method of fabricating an integrated optical device and such a device, comprising a structure including at least one waveguiding element are presented. A basic structure is formed containing a substrate material carrying a buffer material layer coated with a core material layer of a higher refraction index as compared to that of the buffer layer. The at least one waveguiding element is defined in a guiding layer on top of the basic structure. The guiding layer is made of a material with a refractive index higher than the refractive index of the buffer layer and the core layer, and is chosen so as to minimize a height of the at least one waveguiding element and to provide effective guiding of light in the core layer. A cladding layer is formed on top of the so-obtained structure, wherein a height difference between the cladding layer region above the waveguiding element and the cladding layer region outside the waveguiding element is substantially small resulting in a desired flatness of the top cladding layer to allow direct formation of a further waveguide structure thereon and prevent significant perturbations in light propagation within the further waveguide structure.

7 Claims, 11 Drawing Sheets

FOREIGN PATENT DOCUMENTS

| | | |
|---|---|---|
| WO | WO 83/02168 A1 | 6/1983 |
| WO | WO 99/17151 | 4/1999 |
| WO | 01/22141 A1 | 3/2001 |
| WO | 01/27692 A1 | 4/2001 |

* cited by examiner

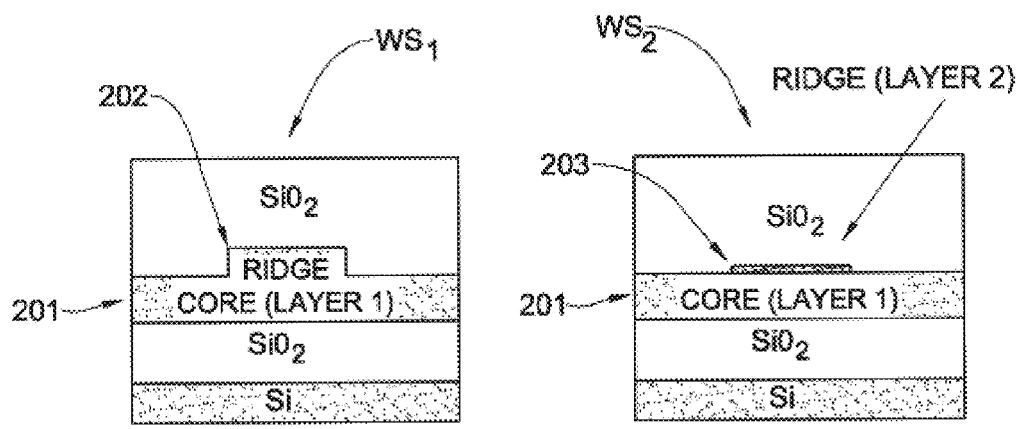
FIG. 2A  FIG. 2B
(PRIOR ART)
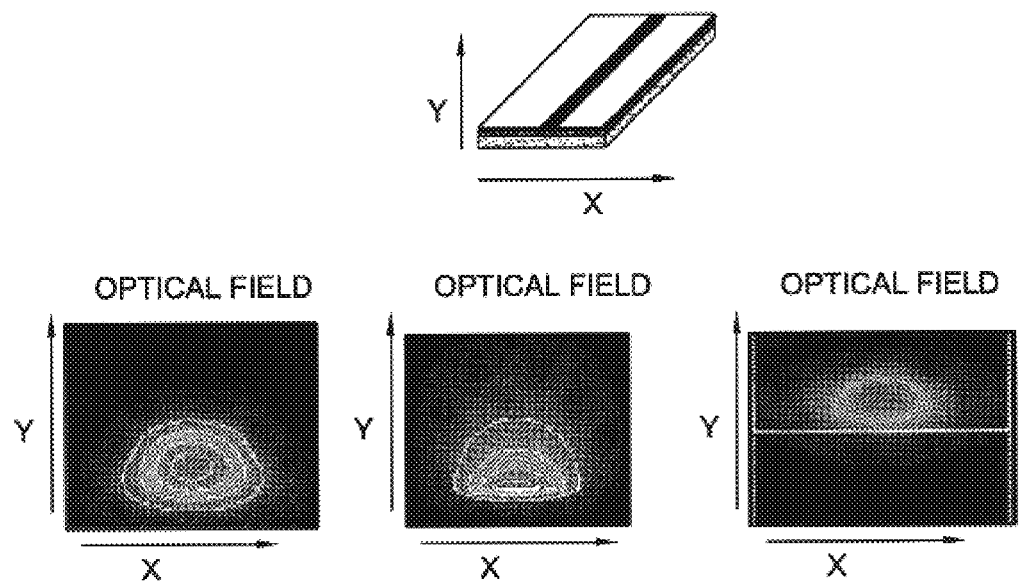
FIG. 3A   FIG. 3B   FIG. 3C

ONE RING

TWO RINGS

THREE RINGS

SINGLE STAGE FILTER (SSF)

MULTILAYER INTEGRATED OPTICAL DEVICE AND A METHOD OF FABRICATION THEREOF

CROSS REFERENCE TO RELATED APPLICATIONS

The present application claims the benefit of U.S. Provisional application No. 60/232,061, filed Sep. 12, 2000.

FIELD OF THE INVENTION

This invention is in the field of Planar Lightwave Circuits (PLC), and relates to a multilayer integrated optical device and a method of fabrication thereof.

BACKGROUND OF THE INVENTION

Optical communications is the enabling technology for the information age, and the essential backbone for long haul communications. As this technology progresses, there is a tremendous interest in providing optical routes in the short haul, metropolitan and access networks, as well as in local area networks and cable TV networks. In all these networks, the best of breed solution for bandwidth expansion has been the adoption of wavelength division multiplexing (WMD), which entails the aggregation of many different information carrying light streams on the same optical fiber. Devices capable of accessing individual information streams are fundamentally required in current and future networks. These devices can also add information streams to the optical fiber, as well as impress information on an optical stream by optical modulation.

PLC technology is central in the creation of modern optical elements for communications systems. According to this technology, optical waveguides and additional functional structures are fabricated in a planar optical transparent medium in order to direct the passage of light and to implement coupling, filtering, switching, and additional processing functions as required for optical communications.

Existing examples of Planar Lightwave Circuits include optical switches and modulators based on Mach Zender Interferometer (MZI), in which interference is produced between phase coherent light waves that have traveled over different path lengths; arrayed waveguide routers (AWG) used for combining and spreading multiple optical channels, namely multiplexers and demultiplexers. However, to achieve a good modulation performance with the MZI, the latter is typically designed with long interference arms. As a result, this device is not size-efficient in its implementation, and limits the scaling ability of complex optical circuits. Another feature of MZI-type devices, in the predominant implementations, is their frequency insensitivity over a desired frequency bandwidth. As a result, MZI-type devices cannot be used directly for wavelength routing.

An important driving force pushing PLC technology is the need for enhanced functionality in the optical domain. This need is hampered by the limitation of state of the art waveguide technology, which is two-dimensional (i.e., single-functional-layer architecture). Unlike the very large scale integrated electronic circuitry, where dimensions of the basic elements were reduced to sub-micrometer size, the optical PLC circuitry is inherently much larger, thus the exploitation of multi-layer architectures is more crucial than in electronics.

In the implementation of PLC, there is a contradiction between the requirements of coupling to optical fibers and decreasing circuit size. Coupling to fibers is best obtained by using waveguides with modal fields similar to the fiber modes with a small refractive index difference with respect to the surrounding medium. The functionality of the optical circuits depends on the amount of optical element in the circuit. By decreasing the circuit size, more optical circuits can be integrated and the attainable functionality increases. Smaller dimensions imply tighter control of the optical mode and smaller optical modes, hence, a high index contrast between the waveguide core and surrounding medium. It is of fundamental importance to provide a means of combining both elevens in one functional optical circuit.

The importance of utilizing the vertical dimensions in creating complex optical circuits has been recognized and addressed in the past. This is associated with the fact that vertical fabrication tolerances are better than horizontal tolerances, and therefor such a vertical integrated optical device (filter, switch, modulator) is simpler or cheaper to manufacture. Optical devices utilizing this approach are disclosed, for example, in the article "*Vertically Coupled Glass Microring Resonator Channel Dropping Filter*", B. E. Little et al., IEEE Photonics technology Letters, Vol. 11, No. Feb. 2, 1999. This approach is critical for the fabrication of optical circuits based on structures with very different indices of refraction such that the effective coupling region between the structures is very small, e.g., coupling between waveguides and ring micro-resonators. In this case, the vertical dimension, which is easier to control in conventional processes, can mediate the structure for accurate coupling as described in the aforementioned reference.

Recently developed integrated electro-optical devices utilize resonant rings to achieve frequency selective switching. Such a device is disclosed, for example, in WO 99/17151. The device comprises a ring resonator interconnected by linear waveguides to couple light from a first linear waveguide to the second one, when the frequency of the light passing through the first waveguide fulfils that of the resonance condition of the ring. By applying an electric field to the ring, its refractive index, and consequently, its resonance condition, can be desirably adjusted, thereby preventing the passage of the previously coupled light, the device therefore acting as a switch. Alternatively, the loss of the ring waveguide can be changed. Adding loss to the ring diminishes its operation as a resonant cavity, and light cannot be coupled from the waveguide to waveguide.

To create two or more layers of interconnected waveguides with the prior art techniques, a planarization step has to be performed. FIGS. 1A–1D illustrate main sequential steps of the prior art technique employed for manufacturing a waveguide structure shown in FIG. 1E being generally designated 10. Initially, a buffer layer 12 of $SiO_2$ is deposited on a silicon wafer 14 (FIG. 1A). Then, a layer 16 of doped $SiO_2$ with a higher refractive index ($SiO_2$+Ge), as compared to that of the buffer layer 12, is deposited onto the buffer layer (FIG. 1B). This layer 16 serves for the formation of a core 16A of the optical waveguide, and its thickness is typically in the range of 4–12 μm. To form the waveguide core 16A (FIG. 1C), the waveguide, as well as other optical structures, are masked using photolithography followed by etching. A third layer of $SiO_2$, or upper cladding layer 18, is then deposited so as to bury the etched structure (FIG. 1D).

This layer 18 retains to some extent the topography of the underlying structure, and thus requires planarization to allow for an additional overlaying waveguide structure to be deposited. Planarization can be implemented by Chemical Mechanical Polishing, reflow techniques, deposition of a very thick layer, selective etching or deposition techniques. As shown in FIG. 1F, after achieving a planar top layer, a second waveguide structure 20 can be fabricated on top of the structure 10 in the above-described manner.

Planarization is a difficult process step, which utilizes expensive equipment and is difficult to be accurately applied for larger area wafers. Therefore, it would be desirable to eliminate this step in the fabrication of multi-layered optical waveguide structures.

SUMMARY OF THE INVENTION

There is accordingly a need in the art to facilitate the manufacturing of a three-dimensional (multi-layered) integrated optical device, by providing a novel method of fabricating such a device, and a novel integrated optical device based on an optical structure embodying different material systems. Such a device may be an optical frequency dependent switch, a modulator, an Optical Add Drop Multiplexer (OADM), a spectral analyzer, a sensor, etc.

The main idea of the present invention consists of utilizing a waveguide definition on several layers, enabling to combine low coupling loss waveguides with high confinement waveguides. The present invention opens new horizons for the functionality of optical device using Planar Waveguide Technology. The present invention provides a fabrication method for the manufacture of the three-dimensional fabrics of waveguides with three-dimensional interconnections. Furthermore, since it is recognized that three-dimensional interconnections are crucial for creating resonator-based, high-density optical circuits, the invention provides a fabrication method for such devices.

The invention provides for the fabrication of three-dimensional optical waveguiding structures by simple processing steps. The main innovation here relates to the elimination or at least alleviation of the planarization step, which is difficult to implement. As indicated above, planarization is required to overcome the perturbations in a given layer caused by the previously deposited layers. In the present invention, the adopt of novel waveguide structures minimizes the perturbation, and facilitates multi-level integration of light guiding structures.

There is thus provided according to one aspect of the present invention, a method of fabricating an integrated optical device comprising a structure including at least one waveguiding element, the method comprising the steps of:

(i) forming a basic structure containing a substrate material carrying a buffer material layer coated with a core material layer of a higher refraction index as compared to that of the buffer layer;

(ii) defining said at least one waveguiding element in a guiding layer on top of said basic structure, wherein said guiding layer is made of a material with a refractive index higher than the refractive index of said buffer layer and the core layer, and is chosen so as to minimize a height of said at least one waveguiding element and to provide effective guiding of light in the core layer;

(iii) forming a cladding layer on top of a structure obtained in step (ii), wherein a height difference between a height of the cladding layer region above said at least one waveguiding element and a height of the cladding layer region outside the waveguiding element is substantially small, thereby providing a sufficient flatness of the top cladding layer to allow formation of a further waveguide structure thereon and prevent significant perturbation in light propagation within said further waveguide structure.

At least one waveguide element may be defined by a ridge of the high index material (as compared to the buffer layer) on top of the basic structure. Alteratively, this waveguide element may be a resonator ring (resonator cavity loop), in which case the further waveguide structure contains a further waveguiding element formed on top of the cladding layer by repeating steps (i) and (ii).

It should be understood that the term "sufficient flatness of the cladding layer" used herein signifies a flatness defined by the height difference of the different regions of the cladding layer (i.e., above the waveguiding element and outside the waveguiding element) much smaller than the optical mode size of a further waveguiding element.

For example, the height difference in the order of few hundreds of nanometers can be obtained, the optical mode size of the further waveguide formed on the cladding layer being about several micrometers. Typically, the height difference of the cladding layer does not exceed the height of the at least one waveguiding element (i.e., the thickness of the guiding layer) covered by said cladding layer.

According to another aspect of the present invention, there is provided a method of fabricating a three-dimensional integrated optical device comprising at least two vertically aligned waveguide structures, each including at least one waveguiding element, the method comprising the steps of:

(a) forming a basic structure containing a substrate carrying a buffer layer coated with a core material layer of a higher refractive index as compared to that of the buffer layer;

(b) defining said at least one waveguiding element of the lower waveguide structure in a guiding layer on top of said basic structure, wherein said guiding layer is made of a material with a refractive index higher than the refractive index of said buffer layer and the core layer is chosen so as to minimize a height of said at least one waveguide element and to provide effective guiding of light in the core layer; and (c) forming an upper cladding layer on top of a structure obtained in step (b), wherein a height difference between a height of the cladding layer region above said at least one waveguiding element and a height of the cladding layer region outside the waveguiding element is substantially small, thereby providing an sufficient flatness of said upper cladding layer to allow direct formation of the upper waveguide structure thereon;

(d) forming said upper waveguide structure on top of said upper cladding layer by depositing a further buffer layer and repeating step (b) and (c) with respect to a further guiding layer, significant perturbation in light propagation within said upper waveguide structure being thereby prevented.

According to yet another aspect of the present invention, there is provided an integrated optical device comprising at least one structure having at least one waveguiding element, the device comprising:

a basic structure containing a substrate material carrying a buffer material layer coated with a core material layer of a higher refraction index as compared to that of the buffer layer;

said at least one waveguiding element formed in a guiding layer on top of said basic structure, wherein said guiding layer is made of a material with a refractive index higher than the refractive index of said buffer layer and the core layer, and is chosen so as to minimize a height of said at least one waveguiding element and to provide effective guiding of light in the core layer;

a cladding layer on top of a structure with said at least one waveguiding element, wherein a height difference between a height of the cladding layer region above said at least one waveguiding element is substantially small, the top cladding layer thereby having a desired flatness.

The device may comprise additional waveguides and additional loop-resonators, forming together several frequency selective switches, thereby providing complex optical signal switching and routing.

Since optical waveguides can be implemented in complex manners, the universal quantity characterizing the behavior of the confined light is the effective refractive index of the waveguide. In conventional devices, the difference between the effective refractive index of the waveguide and the index of the surrounding medium is typically smaller than 1%. When using ring micro resonator structures, the effective refractive index of the ring waveguide has to be large, i.e., typically greater than 20%, to accommodate tight mode confinement and small losses. In these structures, however, the effective index of the ring waveguide and the linear waveguide are similar to within few percents (e.g., about 30%). The present invention provides for using several (at least two) ring resonators (ring waveguides) in an integrated optical device, the refractive index of the ring waveguide being thereby substantially greater (e.g., 20% greater) than the refractive index of the linear waveguide that receives an input signal.

In an optical complex filter/resonator according to the invention, waveguide sections are specifically connected to ring resonators in a configuration which enables realization of optical switching, wavelength routing, optical filtering, etc. The device may also combine a plurality of such filters in a wavelength router module.

Modern optical communications are typically based on transmitting frequency multiplexed optical signals through an optical fiber. The OADM is capable of adding or dropping optical channels from an optical fiber, and is an essential element in modern optical communications. In the present invention, the OADM is based on a combination of tunable filters, which provide the add or drop multiplexing functions. Since OADMs have to meet stringent criteria in the filtering, each ring resonators is an optical filter, and, by combining them in parallel, high order filters are obtained.

In general, the resonator-cavity loops (ring-resonators) can be replaced by any other implementation of a frequency-selective element that couple between the two waveguide sections. For example, optical gratings can be used.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 2A and 2B compare the prior art ridge waveguide structure shown in FIG. 2A to that of the present invention shown in FIG. 2B.

FIGS. 3A and 3B illustrate mode profiles of, respectively, a prior art standard waveguide and a prior art ridge waveguide;

FIG. 3C illustrates a mode profile of a ride waveguide according to the present invention;

DETAILED DESCRIPTION OF A PREFERRED EMBODIMENT

Figures 1A, 1B, 1C:
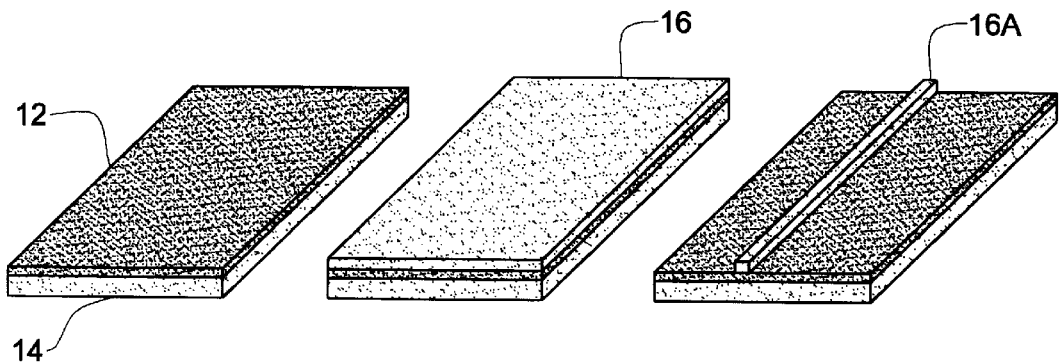
FIGS. 1A to 1F illustrate the prior art technique of manufacturing a waveguide structure.
Figure 1D:
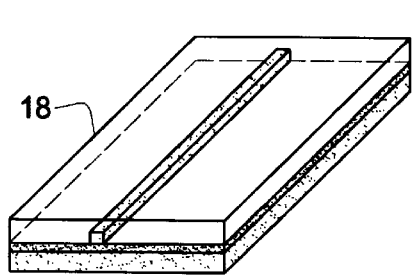
Figure 1E:
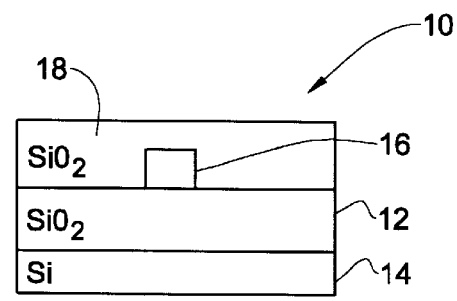
Figure 1F:
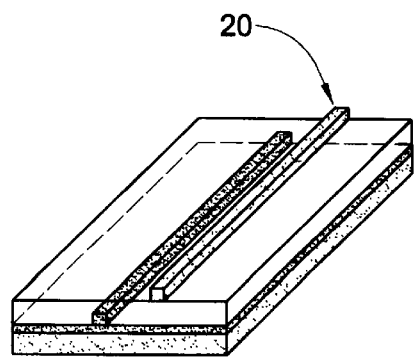

FIGS. 1A–1D illustrate the main principles of the prior art technique applied for manufacturing the waveguide structure 10 shown in FIG. 1E. FIG. 1F illustrates the fabrication of the further structure 20 on top of the structure 10, so as to obtain a three-dimensional integrated optical device. This technique will unavoidably require a planarization procedure to be applied to the uppermost layer of the first structure 10 to allow the deposition of the second structure 20 thereon.

Referring to FIGS. 2A and 2B, a prior art ridge waveguide structure $WS_1$ (FIG. 2A) is compared to a waveguide structure $WS_2$ of the present invention (FIG. 2B) According to the prior art techniques, a ridge 202 was patterned from a core material—Layer 1, which is dielectric or semiconductor material with a refractive index higher than that of the underlying buffer layer ($SiO_2$). For example, the refractive indices of Layer 1 and the underlying buffer layer may be 1.475 and 1.46, respectively. As a result, the height of the ridge 202 has to be a substantial percent of the height of a waveguiding element (e.g., a 3-μm ridge of the total 6-μm waveguiding element).

As shown in FIG. 2B, according to the technique of the present invention, a thin layer of a different material (dielectric or semiconductor), is deposited on top of a layer 201 (Layer 1), and is utilized for fabricating a ridge 203 with a decreased height. The resulting ridge part of the waveguide is much thinner in the vertical dimensions than the ridge part of state of the art ridge waveguide.

FIGS. 3A–3C illustrate the mode profiles (optical fields) of three different light guiding structures. FIG. 3A shows the optical mode of the prior art waveguide structure 10 shown in FIG. 1E, FIG. 3B shows the optical mode of the prior art waveguide structure $WS_1$ shown in FIG. 2A, and FIG. 3C shows the mode of the waveguide structure $WS_2$ of the present invention shown in FIG. 2B. The resulting mode profile in all cases is adaptable to fiber optic coupling, and hence can be used in integrated optical circuits.

Figure 4:
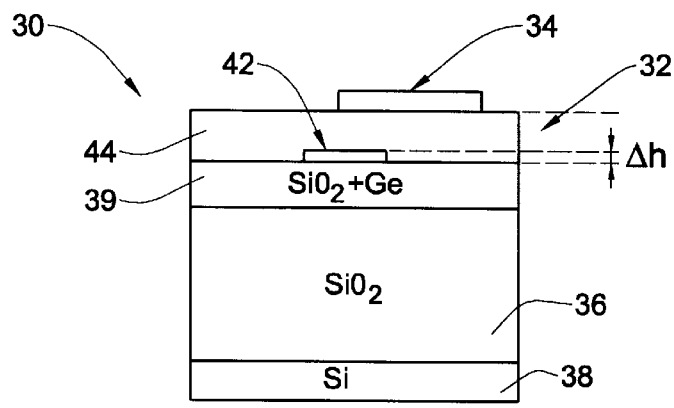
FIG. 4 illustrates a structure definition of a ridge waveguide coupled to a ring resonator, fabricated by a method according to the invention.

Referring to FIGS. 4 and 5A–5E, thee is illustrated one embodiment of the present invention. FIG. 4 shows an integrated optical device 30 composed of a ridge waveguide 32 optically coupled to a ring resonator 34. Ridge waveguides are commonly used in semiconductor-based optical waveguides, while being less commonplace in silica-based waveguides. The integrated optical device 30 can be used as a filter in signal processing applications. To this end, the coupling between the ring resonator 34 and a pair of buried channel waveguides is typically provided, only the lower buried layer being shown in FIG. 4. The buried channels serve as input/output bus guides, while the ring functions as the frequency selective element. At the resonance, power can be substantially transferred from the input port to the drop port.

Figures 5A, 5B, 5C:
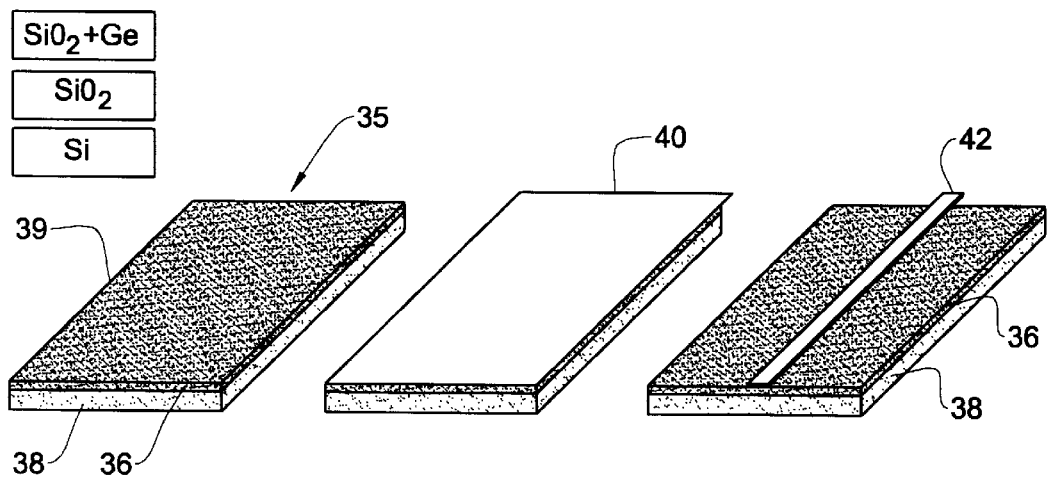
FIGS. 5A to 5E illustrate main manufacturing steps of the method used for fabricating the structure of FIG. 4.

In the present example, the bottom layer waveguides are realized as buried ridge waveguides, with the ridge material being chosen as high index material. FIGS. 5A–5E illustrate the main manufacturing steps of a method according to the invention used for fabricating the structure definition 30. FIG. 5A shows an initial structure 35 obtained by the deposition of a buffer layer 36 of a thickness about 10 μm onto a substrate 38 (usually Silica over Silicon), and deposition of a layer 39 of doped $SiO_2$, e.g., ($SiO_2$+Ge) onto the buffer layer 36. The layer 39 has a refractive index higher than that of the buffer layer 36 (e.g., 1.475 of layer 39 compared to 1.46 of buffer layer 36). The deposition can be of PECVD, LPCVD or another kind.

Then, a dielectric or a semiconductor layer 40 with a higher refractive index (e.g., in the range of 1.51–2.00), as compared to that of the buffer layer 36, is deposited on the upper surface of the layer 39 (FIG. 5B). Specific examples of such a dielectric material include, but are not limited to, Silicone-OxyNitride, doped $SiO_2$, $Ta_2O_5$, poly silicon, amorphous silicon, $Y_2O_3$ (Yitterium Oxide).

The thickness of this guiding layer 40 in which a ridge 42 is formed depends on the difference in the refractive indices of the dielectric and buffer layers. At a further manufacturing step (FIG. 5C), the ridge 42 is created in the layer 40. According to the present invention, a high refractive index dielectric or semiconductor material is used to create the ridge. The height of the ridge is designed so that, after the deposition of the next cladding layer, the combined perturbation is typically smaller than 200 nm.

To create the ridge 42, the ridge material 40 (dielectrical or semiconductor) is covered by photoresist material (not shown), the waveguide surroundings are exposed, and etching is carried out to define the ridge(s) for the waveguide(s). It should, however, be noted that these steps can be replaced by a lift off procedure, wherein, first, the photoresist is applied and the waveguide structure is exposed, and, then, the ridge material is deposited.

Thereafter, a further buffer (serving as a cladding) layer 44 is deposited (FIG. 5D), which may be of the same composition as the first buffer layer 36. A height difference Δh of the height of a region of layer 44 above the ridge 42 and a region of layer 44 outside the ridge 42 (FIG. 4) is small, typically equal to or less than the height of the ridge (e.g., less than 200 nm). This step thereby results in that the top layer 44 is flattened to less than 200 nm, which is suitable for the direct formation of an additional waveguiding structure, i.e., dielectric ring resonators 34 in the present example (only one such resonator being shown here). To this end, a high index dielectric or semiconductor material is deposited (such as $Si_3N_4$, $Ta_2O_5$, Si), and masking of the ring structure 34 is carried out by photolithography. Then, the ring structure undergoes anisotropic etching. Finally, a further burying layer 46 is deposited, usually with the same composition as the buffer layer 36 (i.e. $SiO_2$). By this, significant perturbations of light propagation in the additional waveguiding structure are prevented.

Reference is now made to FIGS. 6 and 7A–7E illustrating a three-dimensional optical coupler 50 formed by a combination of an overlay layer with a waveguide structure (FIG. 6), and the main manufacturing steps in a method of its fabrication (FIGS. 7A–7E). To facilitate understanding, the same reference numbers are used for identifying those structure elements, which are common in the examples of FIGS. 5A–5E and 7A–7E.

Figures 5D, 5E:
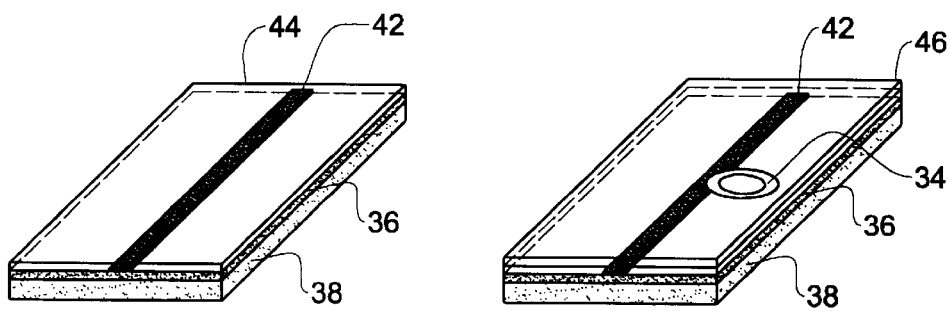
Figure 6:
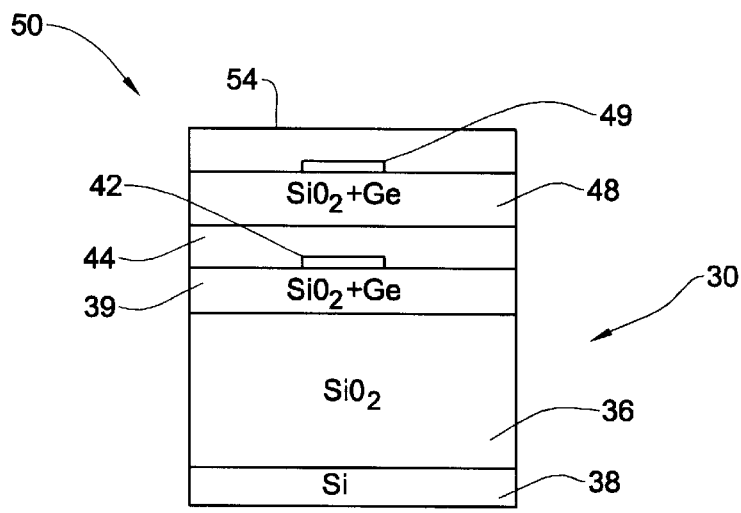
FIG. 6 illustrates a structure definition of a two-layer ridge waveguide optical coupler fabricated by a method according to the invention.
Figures 7A, 7B, 7C:
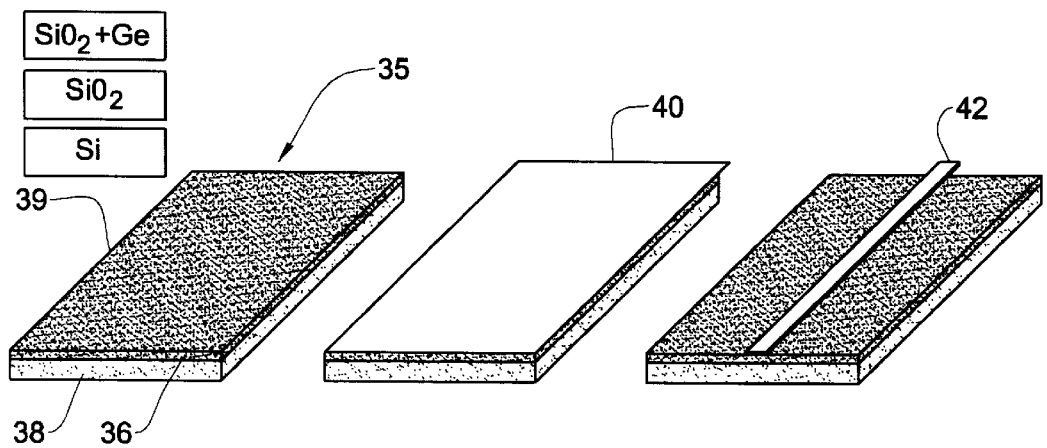
FIGS. 7A to 7E illustrate main manufacturing steps of the method used for fabricating the structure of FIG. 6.
Figures 7D, 7E:
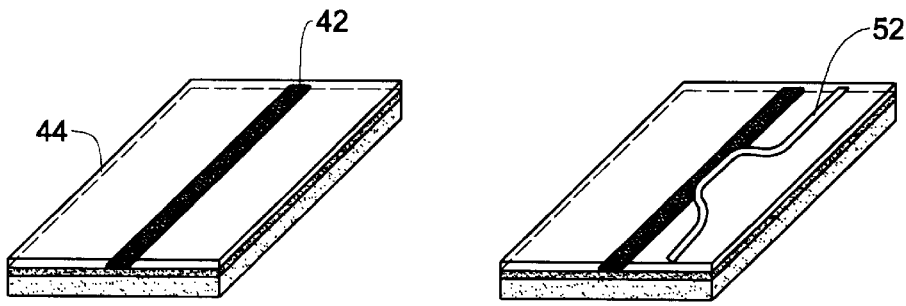

FIG. 7A–7D show manufacturing steps which are similar to those of FIGS. 5A–5D. Namely, the dielectric or semiconductor layer 40 is deposited on the stack-structure 35 formed of the substrate layer 38 (Si), buffer layer 36 ($SiO_2$) and doped silicon layer 39 ($SiO_2$+Ge). The guiding layer 40 has a higher refraction index (e.g., in the range of 1.51–2.00), as compared to the index of refraction of the buffer layer 36, the thickness of the layer depending on the index of refraction difference. This guiding layer may be formed from Silicone - OxyNitride, doped $SiO_2$, $Ta_2O_5$, YO (Yitterium Oxide). Then, the ridge 42 is created in the high refraction index layer 40 (FIG. 5C), and the buffer layer 44 is deposited on the outer surface of the so-obtained structure (FIG. 5D).

At further manufacturing steps, the following procedures are carried out: Further doped silicon layer 48 ($SiO_2$+Ge) and dielectric layer 49 are sequentially deposited. The dielectric layer has either a slightly higher refraction index than the buffer layer (e.g., Silicone OxyNitride, doped $SiO_2$, $Ta_2O_5$, YO), or a much higher refraction index (e.g., $Si_3N_4$ with the index of refraction being 2.00). Photolithography and etching are sequentially applied for, respectively, masking and defining a waveguide 52. Finally, a burying layer 54 (e.g., $SiO_2$) is deposited.

An alternative embodiment of the invention relates primarily to coupling of waveguides and ring resonators. According to this technique, the ring structures are first fabricated (which are relatively thin due to their high refractive index), and then the regular waveguides are defined in the overlay structure. By utilizing relatively broad waveguides with a small refractive index difference, a higher tolerance to potential perturbations in the waveguide structure can be achieved, as a consequence of the residual perturbations of the underlying ring structure.

Figure 8:
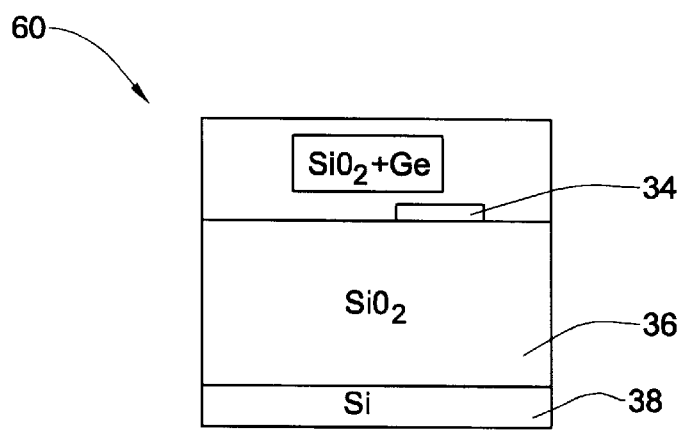
FIG. 8 illustrates a structure definition of a ring resonator coupled to a low index difference waveguide, fabricated by a method according to the invention.

The above approach is exemplified in FIGS. 8 and 9A–9E, wherein FIG. 8 illustrates a complete structure 60 fabricated by sequentially performing the steps shown in FIGS. 9A–9E.

Initially, a buffer layer 36 is deposited on a substrate 38 (usually Silica over Silicon), using PECVD, HPCVD or other deposition methods. Deposited on the buffer layer 38 is a dielectric layer 40 with a much higher refraction index (e.g., $Si_3N_4$). The thickness of the guiding layer 40 depends on the refractive index difference, but can be a few hundred nanometers.

Figures 9A, 9B, 9C:
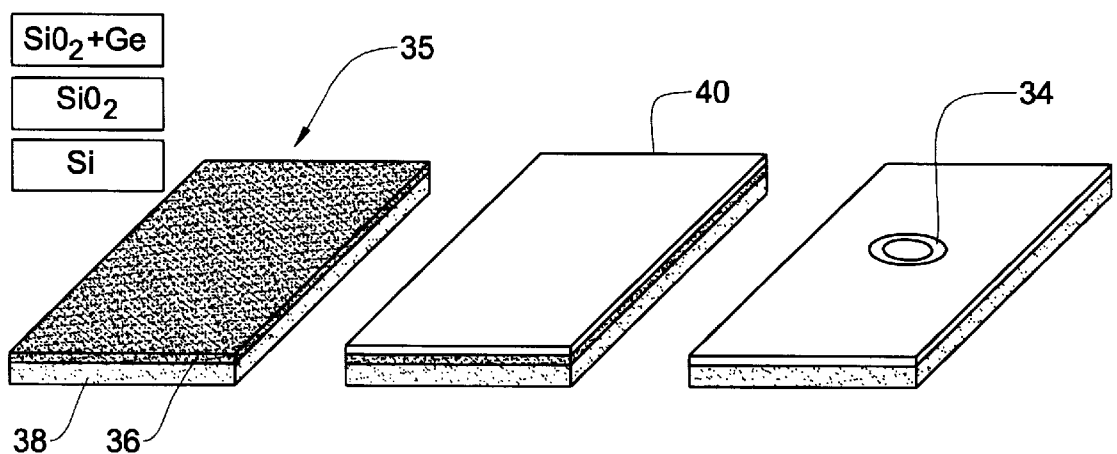
FIGS. 9A to 9E illustrate main manufacturing steps of the method used for fabricating the structure of FIG. 8.
Figures 9D, 9E:
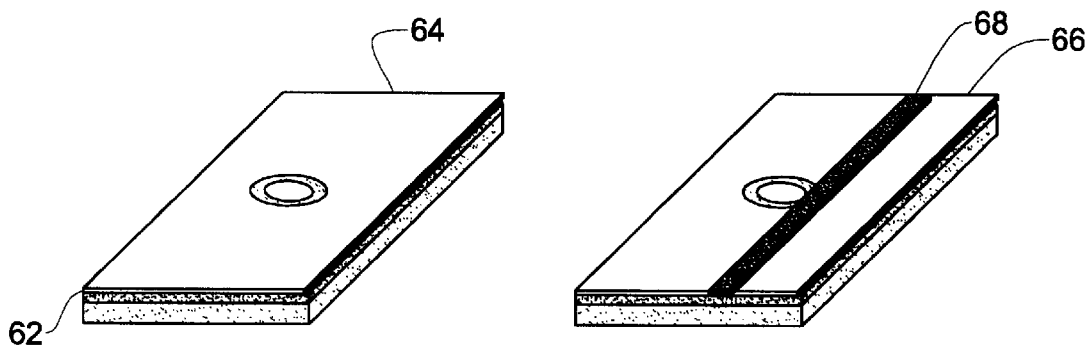

Photolithography is performed to mask the waveguides of the ring structures 34, and anisotropic etching is applied to define the waveguides for the ring structures (FIG. 9C).

Thereafter, a $SiO_2$ buffer layer 62, and a dielectric 64 with a slightly higher refractive index (e.g., in the range of 1.48–1.51) than that of the $SiO_2$ layer are sequentially deposited. This dielectric material may, for example, by Silicone OxyNitride, or $SiO_2$ with a Ge or other doping. Then, the deposition of a photoresist material (not shown), and subsequent exposure and development are carried out to define the waveguides 68. By performing anisotropic etching of the guiding layer, the waveguides are defined. A further $SiO_2$ upper cladding layer 66 is deposited on the so-obtained structure (FIG. 9E) to enable the fabrication of a further layer architecture of the entire structure 60 (FIG. 8).

The following are some possible examples of integrated optical devices that can be manufactured by the above-described methods. It should be noted, although not specifically shown in the figures, that all devices manufactured by the invented technique can be tuned or switched by changing the device temperature using the thermooptic effect. This can be implemented by depositing microresistors (made of Cr, Ni—Cr, PolySilicone, etc.) on top of the multi-layer structures and applying electric current to the microresistors.

Figure 10A:
FIGS. 10A to 10C illustrate ring resonator based filters of, respectively, one, two and three rings, that can be manufactured by the method according to the invention.
Figure 10B:
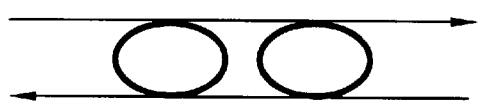
Figure 10C:

FIGS. 10A–10C illustrate ring resonator based filters of, respectively, one, two and three rings. As shown, one or more ring waveguides are accommodated between two linear waveguides, each ring waveguide being optically coupled to the linear waveguides. Each ring resonator is an optical filter, and, by combining them in parallel, high order filters can be obtained. The examples of FIGS. 10B and 10C present a combination of two spaced-apart linear waveguides and two and three spaced-apart resonator-cavity loops, respectively. The resonator-cavity loops are accommodated between the two linear waveguides and are connected to each other through sections of the linear waveguides, such at least two spaced-apart resonator-cavity loops and the waveguides sections creating a closed loop compound resonator for storing optical energy of a predetermined frequency range. The physical characteristics of the compound resonator are controllable (by an external field) to adjust the optical storage characteristics of the compound resonator.

Figure 11:
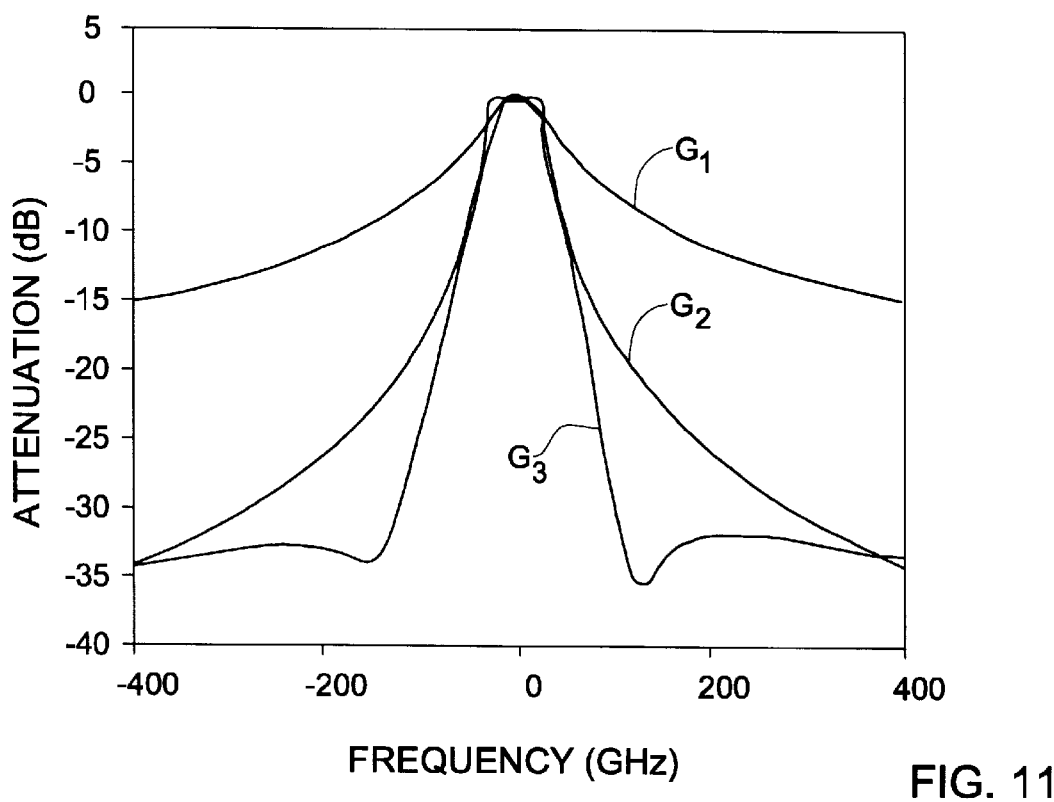
FIG. 11 illustrates the optical spectral response of the ring resonator based filters of FIGS. 10A–10C.

FIG. 11 illustrates the optical spectral response of the ring resonator based filters. Graphs $G_1$, $G_2$ and $G_3$ correspond, respectively, to one-, two- and three-ring filters.

Optical Add Drop Multiplexer

Figure 12A:
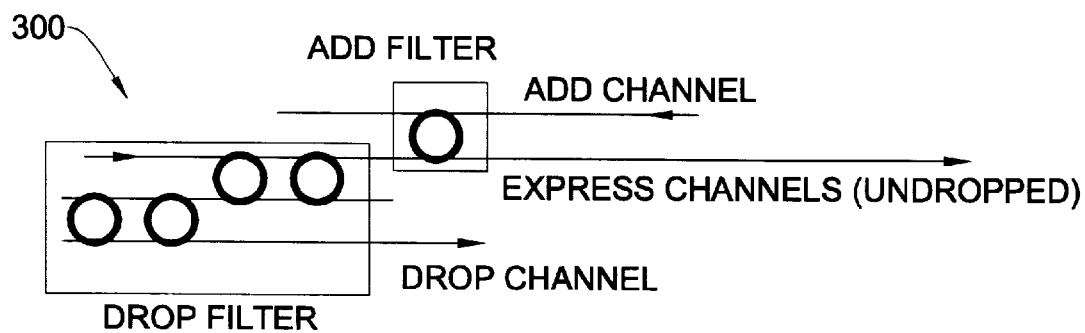
FIGS. 12A and 12B illustrate main constructional features and main functional features, respectively, of a single channel Optical Add Drop Multiplexer (OADM) according to the invention.
Figure 12B:
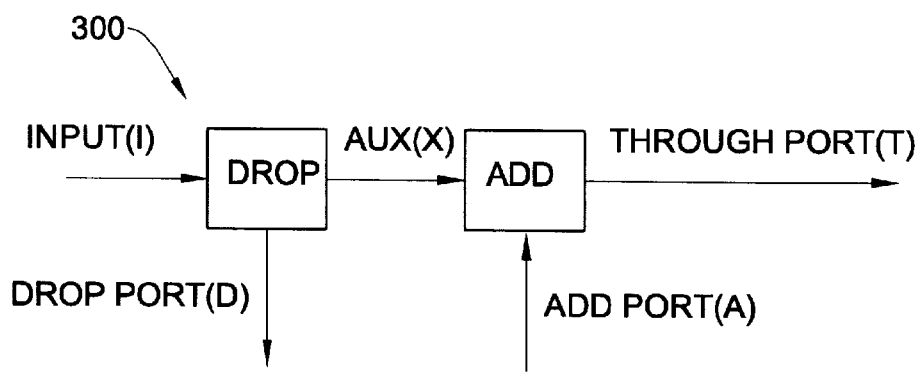

FIGS. 12A and 12b illustrate main constructional features and main functional features, respectively, of a single channel Optical Add Drop Multiplexer (OADM), generally designated 70. The OADM 70 is composed of two compound resonators 72 and 74, each constructed as described above, namely, including two ring-resonators accommodated between and coupled to two linear waveguides. Here, each ring resonator is an optical filter, and, by combining them in parallel, high order filters are obtained. The drop port (filter) is implemented using a double filter pass, while the add port is obtained with a single filter.

Figure 13:
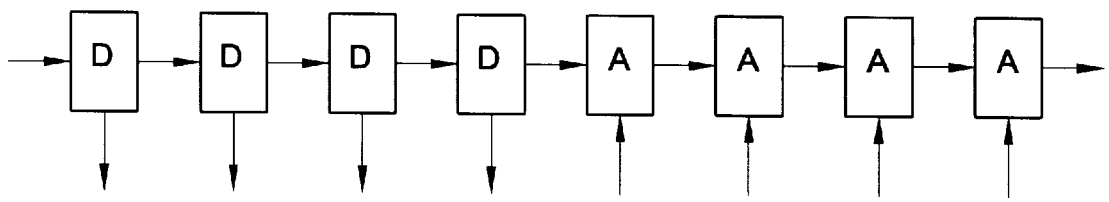
FIG. 13 illustrates a four port add drop multiplexer according to the invention.

FIG. 13 illustrates a four port add drop multiplexer. Here, multiple channel OADMs are obtained by cascading the structures of FIGS. 12A–12B. In a real system, four blocks D are followed by four blocks A.

Figure 14:
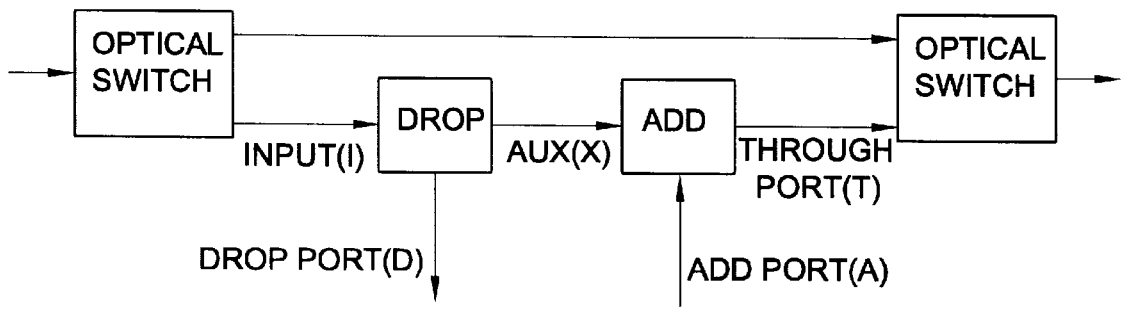
FIG. 14 illustrates an example of the integration of switches and add drop filters for switch-able filters.

FIG. 14 illustrates an example of the integration of switches and add drop filters for switch-able filters. Here, optical switches are added to insert and extract the ring based OADM from the optical path to allow hitless operation - not disturbing the through channels while tuning the OADM filters.

Interleaved Filters

Figure 15A:
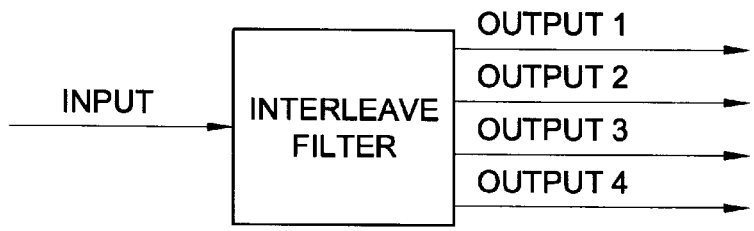
FIGS. 15A and 15B illustrate the construction and operational principles of an interleave filter.
Figure 15B:
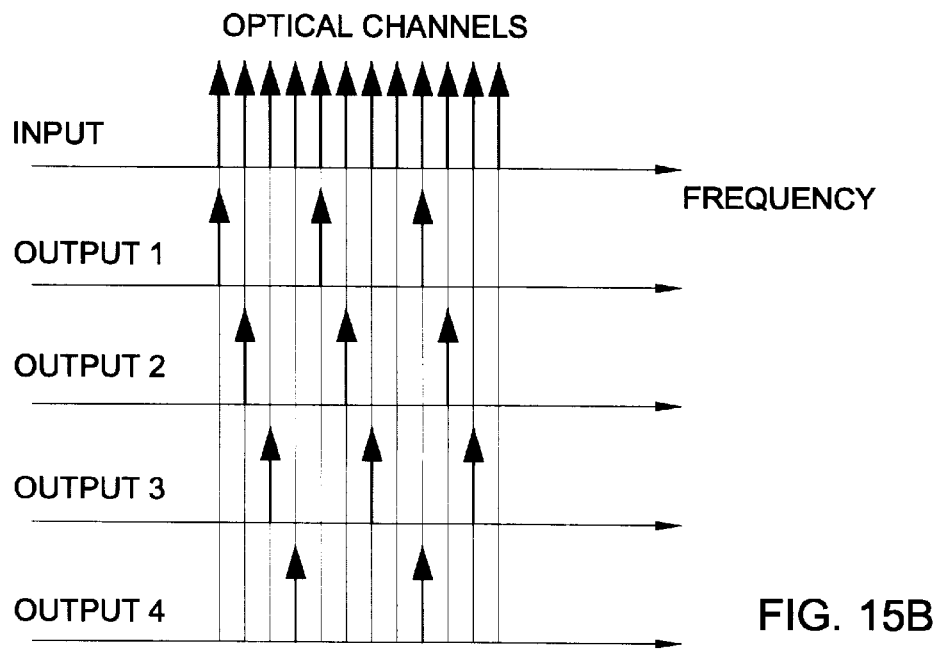

Interleave filters are typically employed to achieve tight channel spacing in optical communication systems. As shown in FIG. 15A, such a filter accepts an incoming signal composed of optical channels with a small frequency spacing and distributes the input channels amongst output waveguides in a circular function. Spectral functionality of this interleaved filter is shown in FIG. 15B. The output frequencies have a wider frequency spacing, resulting in wider tolerances from the optical elements. Interleaved filters are critical elements in achieving very tight frequency spaced optical channels.

Ring resonators are ideal candidates for implementing an interleave filter in a planar lightwave circuit. A particular embodiment is obtained by using a ring resonator with a free spectral range (FSR), which is equal to the desired output frequency spacing. FSR is the frequency at which the response of an optical filter repeats itself.

Figure 16A:
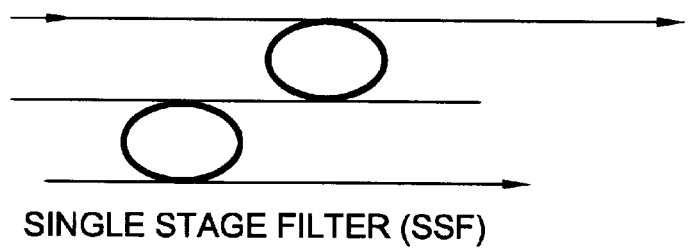
FIGS. 16A and 16B illustrate the construction and operational principles of a single channel separation element (filter) according to the invention utilizing ring resonators optically coupled to linear waveguides.
Figure 16B:
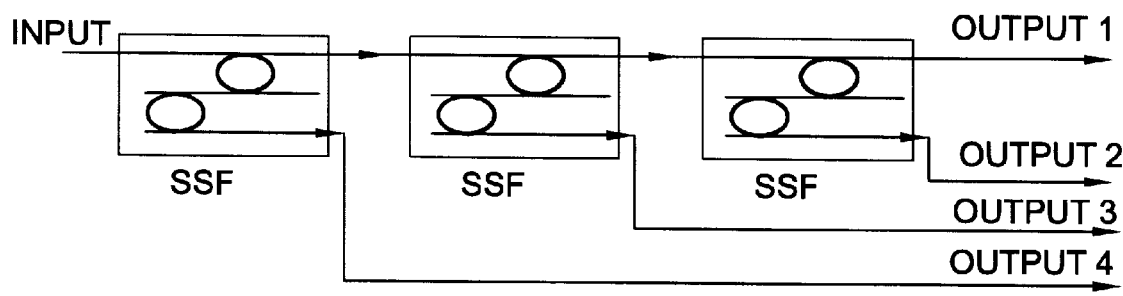

FIG. 16A illustrates a single channel separation element (filter) utilizing ring resonators optically coupled to linear waveguides. As shown in FIG. 16B, by combining four single stage filters (SSF) of FIG. 16A, the interleaved filter of FIG. 15A can be obtained.

Optical Spectrum Analyzer

The real time monitoring of optical networks poses the following challenges for spectral analysis systems: high resolution; short spectrum acquisition time; low cost; low loss on the optical link; and small size. In standard spectrum analyzers, where the wavelength separation element is based on gratings, high resolution implies larger size and higher cost. An alternative would be to use tunable filters to scan across the optical spectrum of interest. However, existing tunable filters are limited in their ability to provide the required resolution.

The technique of the present invention provides for manufacturing a compound high Q optical ring resonator structure operable as a filter, which is used in the analysis of optical spectra.

Figure 17:
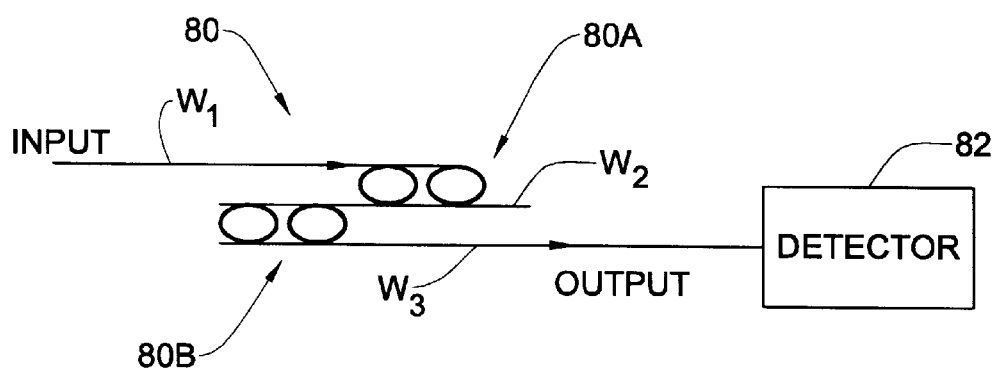
FIG. 17 illustrates a spectral analysis filter according to the invention.

FIG. 17 illustrates a spectral analysis filter 80 associated with a detector 82. The filter 80 comprises two compound resonators 80A and 80B connected in parallel through a common linear waveguide $W_2$, and serves as a compound high Q optical ring resonator structure. The output linear waveguide $W_3$ of the structure is connected to the detector 82. The Q of the filter is determined by the coupling factor describing the amount of light that is coupled into the filter at every round trip. The Q factor is also determined by the optical losses in the cavity and the ring radius.

Figure 18:
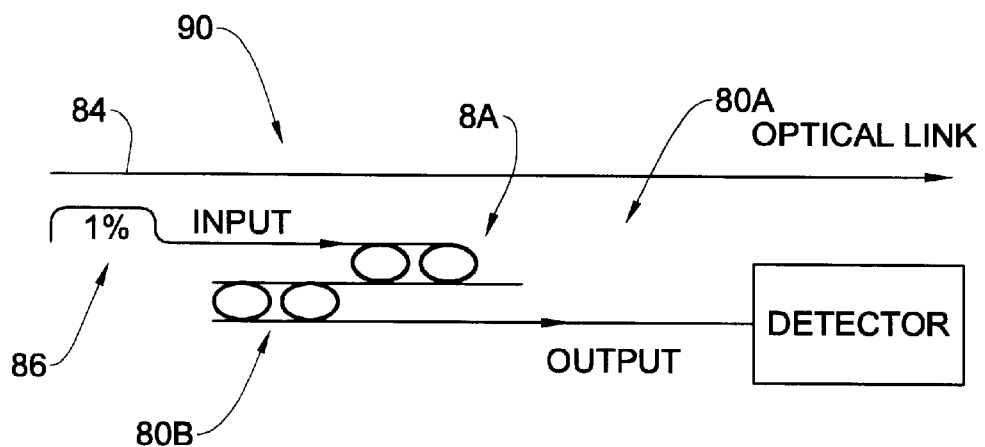
FIG. 18 illustrates a tap coupler and spectral analysis system utilizing the spectral analysis filter of FIG. 17.

FIG. 18 illustrates a tap coupler and spectral analysis system, generally designated 90, utilizing the combination of the spectral analysis filter 80 and detector 82. The filter 80 is connected to an optical network (link) 84 via a coupler 86, which taps a small amount of light, thereby minimizing the losses incurred in the optical link.

Figure 19:
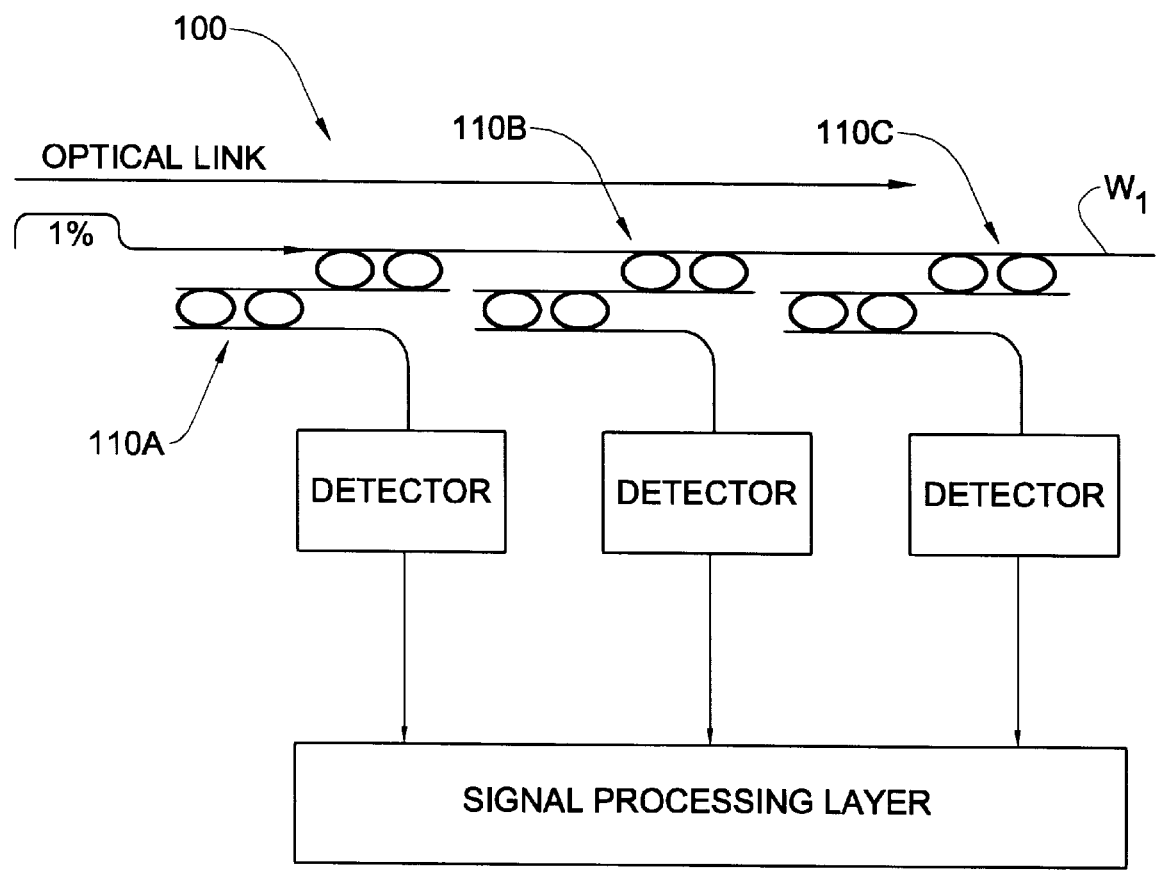
FIG. 19 illustrates a spectrum analyzer according to the invention utilizing several spectral analysis filters of FIG. 17.

FIG. 19 illustrates a spectrum analyzer 100 utilizing several spectral analysis filters—three such filters 110A, 110B and 110C in the present example, used in parallel through a common input linear waveguide $W_1$. Each filter has a different radius, as compared to the others, and therefore is capable of carrying out a spectral analysis on a different portion of the communications spectrum. This feature is associated with two problems that may occur when using ring resonators, namely, limited tuning range and limited free spectral range, resulting in that a different approach has to be adopted to scan across a wide spectrum. In addition, this parallel approach provides for reducing the scan time required to approach all frequency channels of the communications spectrum.

Sensor

Figure 20A:
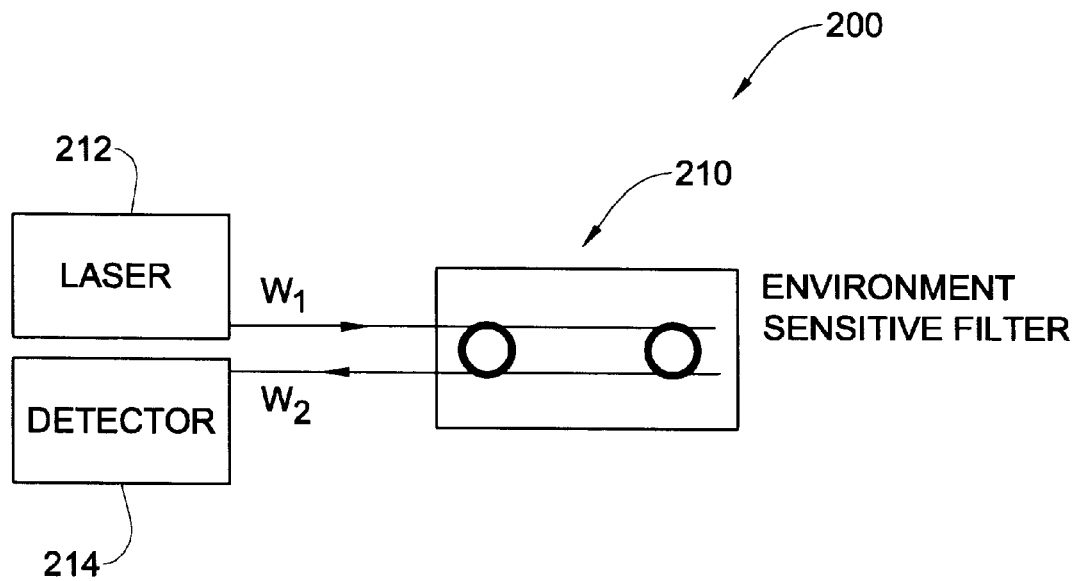
FIGS. 20A and 20B illustrate the construction and operational principles of a sensor device utilizing an environmental sensitive filter according to the invention.
Figure 20B:
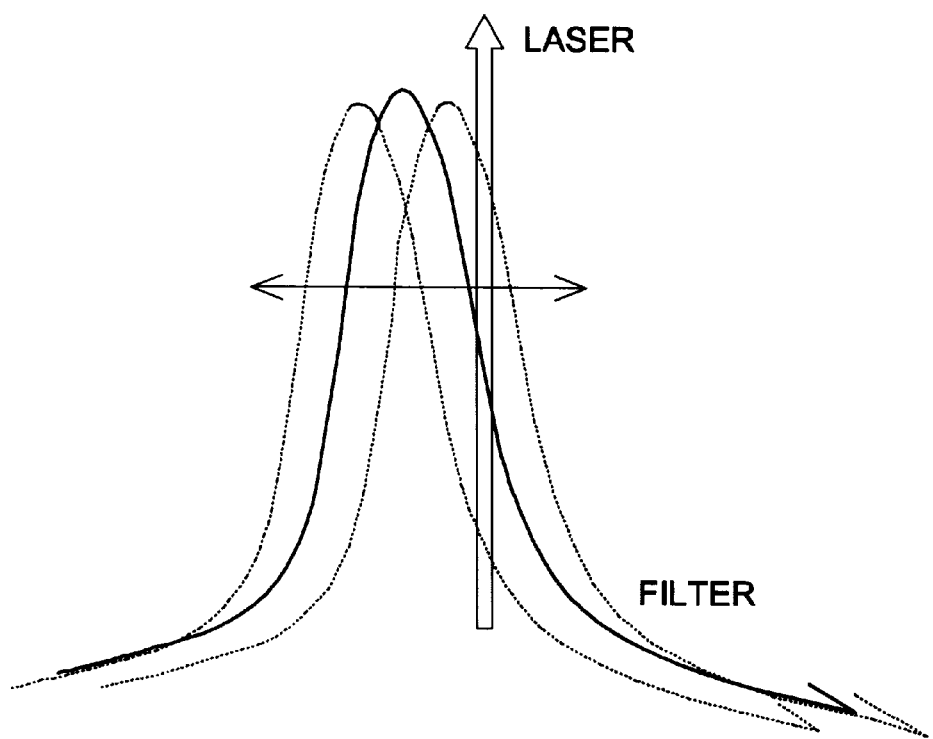

A high Q optical filter can be used as a very sensitive sensor for various applications, such as a biological, mechanical, or temperature sensor. To this end, the filter characteristics depend on the external element to be measured. FIG. 20A illustrates a sensor device 200 comprising an environmental sensitive filter 210 constructed as the above-described compound resonator, which is connected to a laster 212 and a detector 214 through its input and output waveguides. $W_1$ and $W_2$, respectively. Such a high Q optical filter structure is used as a sensor, which is suitable for various applications, such as a biological, mechanical, or temperature sensor. This is due to the fact that the filter characteristics depend on the external element to be measured. FIG. 20B shows the results of tuning the laser 212 to the edge of the filter 210. Generally speaking, the environmental element changes the resonance frequency of the filter, which results in a change of the optical power at the detector. With proper calibration, this device can be used to measure or monitor various physical, mechanical or biological environmental changes.

Those skilled in the art will readily appreciate that various modifications and changes can be applied to the preferred embodiments of the invention as hereinbefore exemplified without departing from its scope defined in and by the appended claims.

What is claimed is:

1. An integrated optical device comprising at least one structure having at least one waveguiding element, the device comprising:

a basic structure containing a substrate material carrying a buffer material layer coated with a core material layer of a higher refraction index as compared to that of the buffer layer;

said at least one waveguiding element formed in a guiding layer on top of said basic structure, wherein said guiding layer is made of a material with a refractive index higher than the refractive index of said buffer layer and the core layer, and is chosen so as to minimize a height of said at least one waveguiding element and to provide effective guiding of light in the core layer;

a cladding layer on top of a structure with said at least one waveguiding element, wherein a height difference between a height of the top cladding layer region above said at least one waveguiding element and a height of the cladding layer region outside the waveguiding element is substantially small, the top cladding layer thereby having a desired flatness.

2. The device according to claim 1, operable as an optical frequency dependent switch.

3. The device according to claim 1, operable as an optical tunable filter.

4. The device according to claim 1, operable as an Optical Add Drop Multiplexer (OADM).

5. The device according to claim 1, operable as a spectral analyzer.

6. The device according to claim 1, operable as a sensor.

7. The device according to claim 1, further comprising an additional structure formed on top of said cladding layer and including at least one waveguiding element, the device being thereby a three-dimensional integrated optical device formed of the lower and upper structures, each including at least one waveguiding element.

* * * * *